J. BUCHLI.
TOOTHED WHEEL DRIVING MECHANISM OF ELECTRIC LOCOMOTIVES.
APPLICATION FILED SEPT. 28, 1917.
1,326,568.
Patented Dec. 30, 1919.
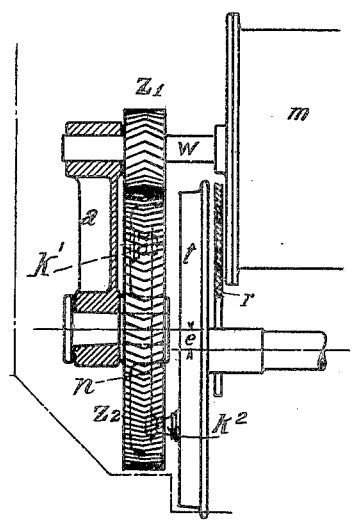
Jacob Buchli
INVENTOR
BY Albert Parker
ATTORNEY

UNITED STATES PATENT OFFICE.

JACOB BUCHLI, OF BADEN, SWITZERLAND, ASSIGNOR TO A. G. BROWN BOVERI & CIE., OF BADEN, SWITZERLAND.

TOOTHED-WHEEL DRIVING MECHANISM OF ELECTRIC LOCOMOTIVES.

1,326,568.  Specification of Letters Patent.  Patented Dec. 30, 1919.

Application filed September 28, 1917. Serial No. 193,854.

*To all whom it may concern:*

Be it known that I, JACOB BUCHLI, a citizen of the Swiss Republic, residing at No. 18 Ländliweg, Baden, Switzerland, have invented certain new and useful Improvements in the Toothed-Wheel Driving Mechanism of Electric Locomotives, of which the following is a specification.

In electric locomotives it has already been proposed to transmit the power from the motors located on the locomotive framing by means of toothed wheels mounted in fixed bearings in parts of the locomotive framing and located outside the driving wheels, and by means of universal couplings, to the driving axles, for the purpose, first, of utilizing the entire width of the vehicle between the driving wheels for accommodating the motor, and, further, of reducing as much as possible the weight of the non-spring-supported parts of the driving mechanism.

Since it is advantageous to employ motors running at as high a speed as possible, it is necessary to effect a speeding-down from the motor to the driving axle. Now the extent of such a speeding-down is limited, unless more than one pair of toothed wheels are employed. The reason for this, is that, in consideration first of the permissible outline of the vehicle, and second, of the range of play of the springs, the large toothed wheel coupled flexibly to the driving wheel, must be considerably smaller than the driving wheel after maximum wear of the tires. Since however the motor and the pinion located on the motor shaft are situated on different sides of the driving wheel, it is necessary to carry the motor shaft outside and past the periphery of the driving wheel at a distance from the said periphery suited to the range of play of the springs. This condition fixes the minimum distance between the axes of the two wheels, and it also fixes the diameter of the pinion for a given maximum diameter of the large toothed wheel; it thus fixes an upper limit for the speeding-down ratio.

With a single-purchase gear the designer is sometimes compelled to employ a too low and inconvenient speeding down ratio, and also a motor that runs at a lower speed than is desirable from the point of view of economy, cost and weight.

With a view to remedying this drawback it has been proposed to arrange between the large toothed wheel and the pinion an intermediate wheel having no influence upon the speed ratio and serving merely to bridge the distance between the two toothed wheels.

The problem has been solved without the use of any intermediate members, by the present invention according to which the axis of the large toothed wheel is shifted up relatively to the driving axle, and preferably in the vertical direction in cases where the motor is situated vertically over the driving axle. By this means a considerable effect is produced with only a slight eccentricity of the axes of the two wheels. Namely, if the axis of the large toothed wheel be shifted up through a given distance, the said large toothed wheel can have its diameter increased by twice the amount of the eccentricity, and consequently the diameter of the pinion can be reduced by four times the said amount.

Let $e$ be the amount of the eccentricity and $u = d_1 : d_2$ the speed ratio of the gear in the construction hitherto employed, where $d_1$ and $d_2$ are the respective diameters of the wheels, then according to the present invention the speed ratio will be increased to the value $$u = (d_1 - 4e) : (d_2 + 2e).$$

If a smaller speed ratio is sufficient, the diameter of the motor may be increased accordingly, and thus a higher-powered motor may be accommodated. For example, with a speed ratio $$u = (d_1 - 2e) : (d_2 + 2e)$$

the diameter of the motor may be increased by $2e$.

The manner in which the gear wheel is coupled to the driving wheel does not form the subject matter of the present invention. In any case, the coupling between the eccentric wheels must be of a flexible type so as not to interfere with the play of the springs. Couplings of this type are known and described in the literature of the art.

An embodiment of the invention is illustrated in the accompanying drawing.

$m$ is the motor fixed on the spring-supported framing $r$ of the locomotive. W is the motor shaft on which the pinion $Z_1$ is located. The large toothed wheel $Z_2$ is mounted in the bracket $a$ which is fixed to the framing $r$. The wheel $Z_2$ is coupled to the driving wheel $t$ by means of a coupling $k$ which is indicated diagrammatically in the figure, and is of the character described in my co-pending application No. 203349, filed November 22, 1917, with particular reference to Fig. 7 of that application. The said coupling may be made with either flexible or rigid connecting rods as indicated diagrammatically by the dotted lines $n$ in the drawing, these rods being pivoted at their upper ends on the pivots $k'$ of the geared wheel $z_2$ and at their lower ends being pivoted at $k_2$ to quadrant levers on the driving wheel $t$. The axis of the large toothed wheel $Z_2$ is located according to this invention above the axis of the driving wheel $t$ by an amount $e$ which varies with the play of the springs. The standard outline for railway vehicles, within which the parts of the driving mechanism must be situated, is indicated by a dot and dash line.

What I claim is:—

1. In the driving mechanism of electric locomotives, the combination, between the motor shaft and the driving wheel axle, of a single-purchase speeding-down gear whereby in the axis of the large toothed wheel of the speeding-down gear is located higher relatively to the axis of said driving wheel axle, and a coupling between said large toothed wheel and said driving wheel axle.

2. In toothed wheel driving mechanism of electric locomotives wherein the motors are mounted in fixed bearings in the spring-supported locomotive framing, and the toothed wheel gear for speeding-down from the motor to the driving wheel is mounted in fixed bearings in the locomotive framing, the combination with the driving wheel axle, of the shaft of the large wheel of the toothed gear, located above said driving wheel axle, and a coupling between said shaft and said driving wheel axle, whereby a sufficiently large speeding down ratio between the motor and the driving wheel axle can be obtained by means of a single-purchase gear without special intermediate members.

In testimony whereof I have signed my name to this specification.

JACOB BUCHLI.